No. 639,612.  
C. A. RAY.  
THILL FOR VEHICLES.  
(Application filed Feb. 8, 1899.)

Patented Dec. 19, 1899.

(No Model.)

WITNESSES:

INVENTOR  
Charles A. Ray.  
BY  
ATTORNEYS.

UNITED STATES PATENT OFFICE.

CHARLES A. RAY, OF BRIDGEWATER, SOUTH DAKOTA.

THILL FOR VEHICLES.

SPECIFICATION forming part of Letters Patent No. 639,612, dated December 19, 1899.

Application filed February 8, 1899. Serial No. 704,934. (No model.)

*To all whom it may concern:*

Be it known that I, CHARLES A. RAY, of Bridgewater, in the county of McCook and State of South Dakota, have invented a new and useful Improvement in Thills, of which the following is a full, clear, and exact description.

The object of the invention is to provide a simple and inexpensive device for connecting a cross-bar and shafts or thills and to so construct the device that the cross-bar may be expeditiously and conveniently disconnected from the thills or shafts and all parts be closely packed together.

A further object of the invention is to provide a coupling for the cross-bars of thills of such a character that while the cross-bar may be carried rearwardly from the couplings forward draft upon the cross-bar will tend to more tightly fix the bar in place.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
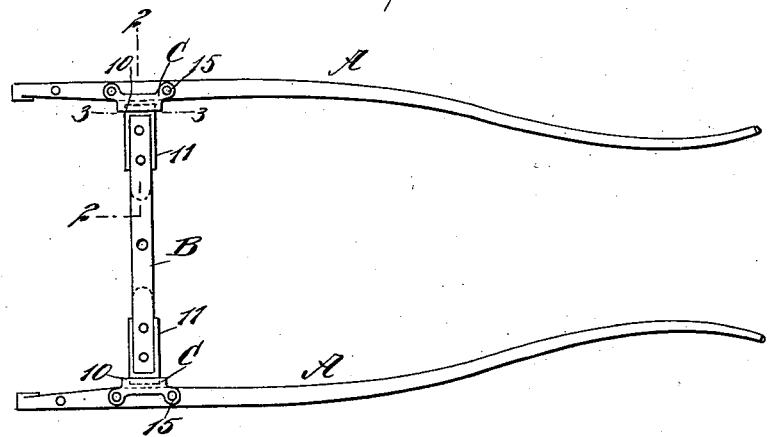
Figure 2:
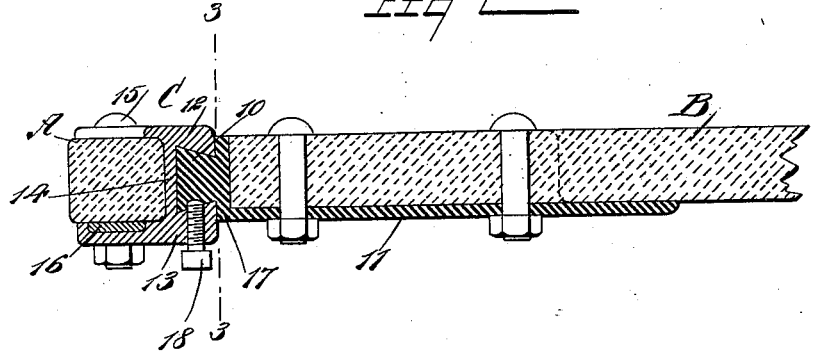
Figure 3:
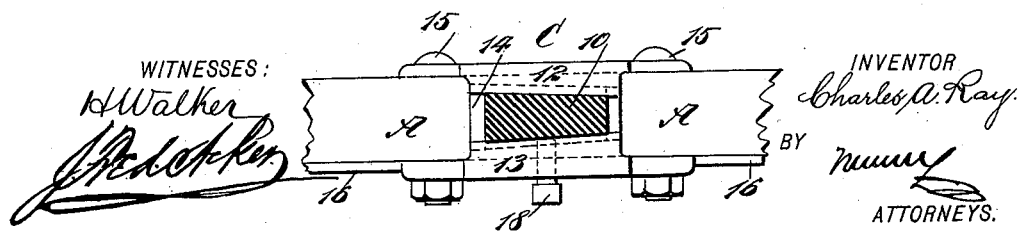

Figure 1 is a plan view of shafts or thills, a cross-bar, and an improved coupling connecting the cross-bar to said shafts or thills. Fig. 2 is a section taken practically on the line 2 2 of Fig. 1, and Fig. 3 is a transverse section taken practically on the line 3 3 of Figs. 1 and 2.

A represents the shafts or thills, B the cross-bar adapted to connect them, and C the couplings whereby the cross-bar is connected with the thills or shafts A. A dovetail longitudinally-tapering tenon 10 is located at each end of the cross-bar B, being attached thereto through the medium of straps 11, that are preferably carried longitudinally beneath the cross-bar and upward across its ends. The taper of the tenons 10 is in direction of the forward edge of the cross-bar, and the tenons are thickest at their rear extremities, as shown in Fig. 3.

The couplings C consist of an upper jaw 12 and a lower jaw 13, connected between their inner and outer longitudinal surfaces by a back-plate 14. When the couplings are attached to the thills or shafts A, the back-plates of the couplings engage with the inner faces of the said thills or shafts, so that the forward portions of the jaws 12 and 13 extend inwardly beyond the inner longitudinal surfaces of the shafts or thills, and the rear portions of the jaws 12 and 13 of the couplings extend, respectively, over the top and bottom portions of the thills or shafts in an outwardly direction, being secured to the thills or shafts by bolts 15, as illustrated in the drawings.

The usual metal straps 16, located at the bottom portions of the shafts or thills, as shown in section in Fig. 2, are located between the bottom jaws of the couplings and under faces of the shafts or thills. The space between the inner members of the jaws 12 and 13 is a dovetail tapering space, said space being contracted in a forwardly direction, and in operation the tenons of the cross-bar B are entered within the inner members of the jaws of the coupling C from the rear, and the cross-bar is forced forwardly until its tenons are wedged in the space 17 between the jaws of the couplings, as shown in Fig. 2. It is therefore obvious that while the cross-bar when moved rearwardly may be disengaged from the couplings, it is impossible to disconnect the cross-bar when tension is applied thereto in a forwardly direction, as forward tension or draft on the cross-bar will but tend to hold it the more firmly in the couplings. In order to prevent the cross-bar being accidentally detached from the thills should it be struck by the hoof of an animal, set-screws 18 are passed through the lower jaws of the couplings into recesses formed in the under faces of the tenons.

Having thus described my invention, I claim as new and desire to secure by Letters Patent—

1. The combination with the thills or shafts, and the couplings rigidly attached thereto, and each having an upper and a lower jaw extending inwardly beyond the inner surface of the said thills or shafts and having a dovetail space between the jaws tapering in a forwardly direction, of a cross-bar for connecting the thills, the said cross-bar being provided at its ends with dovetail tapering tenons rigidly secured thereto and arranged to readily enter the spaces between the jaws of the respective couplings from the rear thereof, the tenons having a wedging engagement with the said jaws under a forward tension of the cross-bar, and locking devices carried by the couplings and arranged for engagement with the tenons, substantially as described.

2. The combination with the shafts or thills, and the couplings each consisting of an upper and a lower jaw connected between their inner and outer longitudinal surfaces by a back-plate, the back-plates engaging with the inner faces of the shafts so that the forward portions of the jaws extend inwardly beyond the inner faces of the shafts forming a space between the jaws, and the rear portions of said jaws extend outwardly over the top and bottom portions of the shafts, being secured to the said shafts, the part of each coupling engaging the under face of the shafts being formed with a channel to receive the metal strap extending along the bottom portion of the shafts, of a cross-bar provided with tenons at its ends arranged to enter the spaces between the jaws of the couplings, and having a wedging engagement with said jaws, and set-screws carried by the lower jaws of said couplings, and adapted to engage recesses in the under faces of the tenons on the ends of the cross-bar, substantially as described.

CHARLES A. RAY.

Witnesses:
L. PRITZKAN,
C. L. MARSH.